Nov. 7, 1950 E. VASSY 2,528,924
AUTOMATIC REGISTERING MICROPHOTOMETER
Filed Feb. 4, 1948 6 Sheets-Sheet 1

Inventor
Etienne Vassy
By
E. F. Wenderoth
Attorney

FIG. 2

Nov. 7, 1950          E. VASSY          2,528,924
AUTOMATIC REGISTERING MICROPHOTOMETER

Filed Feb. 4, 1948          6 Sheets—Sheet 4

Inventor
Etienne Vassy
By
E. F. Wenderoth
Attorney

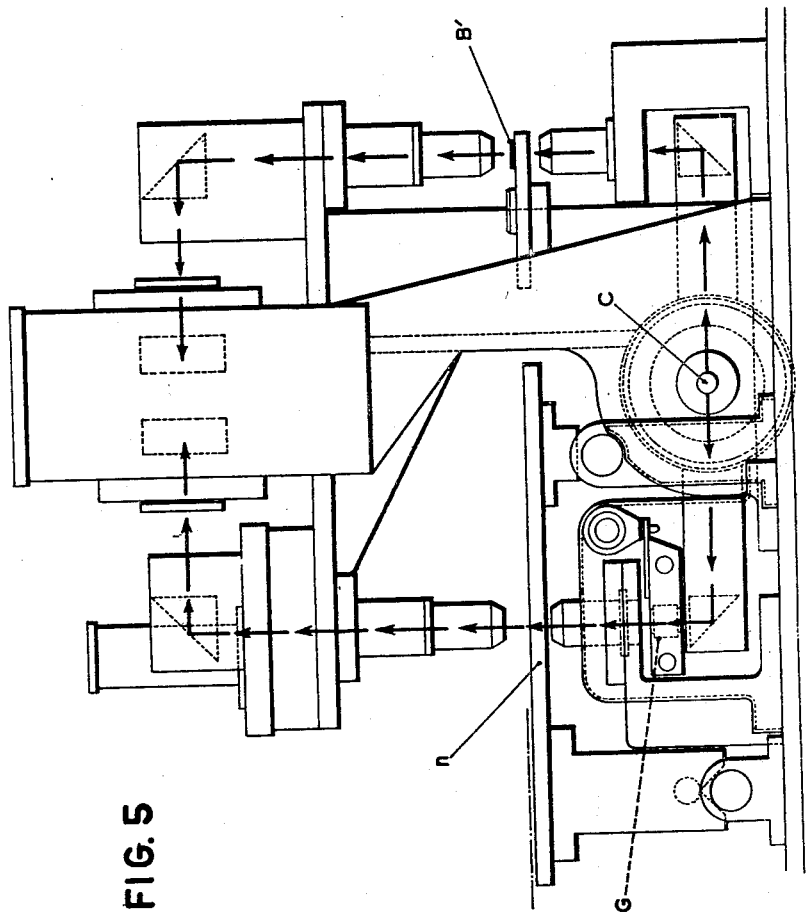

Nov. 7, 1950  E. VASSY  2,528,924
AUTOMATIC REGISTERING MICROPHOTOMETER
Filed Feb. 4, 1948  6 Sheets-Sheet 6
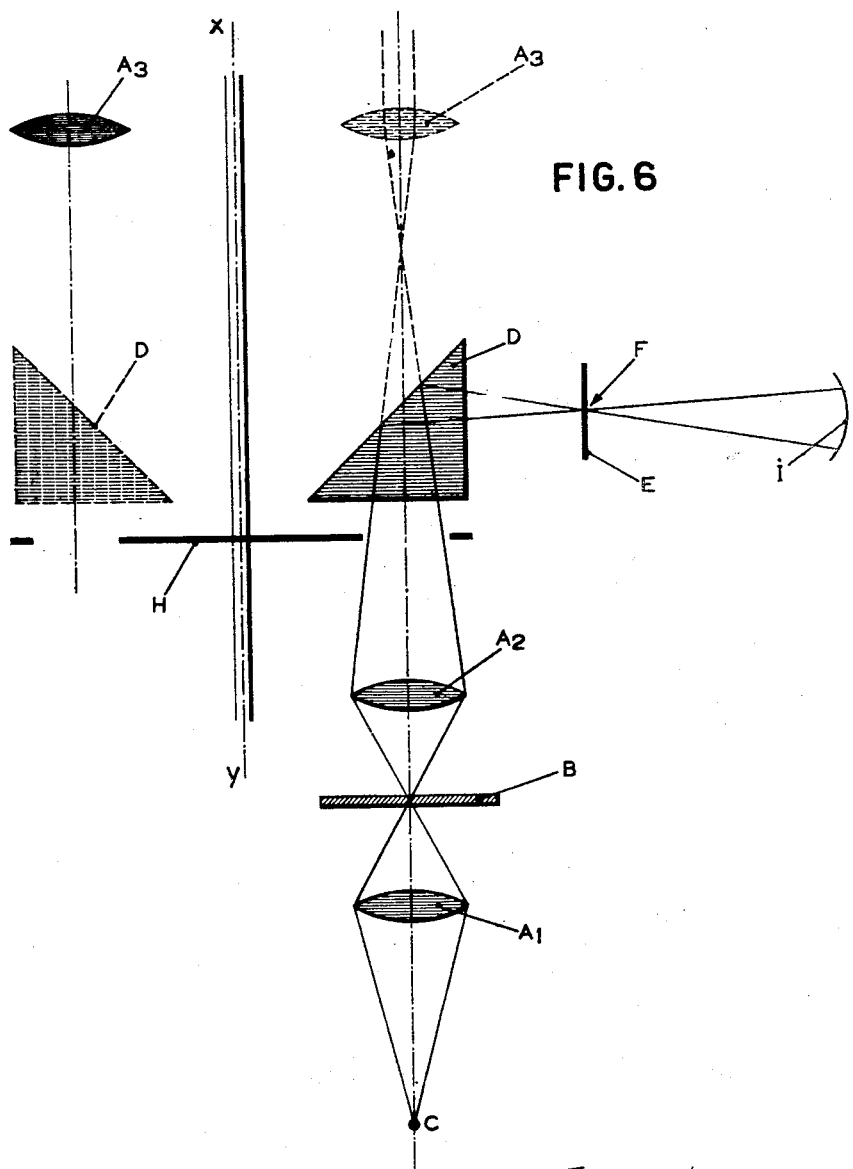

Patented Nov. 7, 1950

2,528,924

UNITED STATES PATENT OFFICE 2,528,924

AUTOMATIC REGISTERING MICROPHOTOMETER

Etienne Vassy, Paris, France

Application February 4, 1948, Serial No. 6,315 In France June 13, 1944

4 Claims. (Cl. 346—32)

An object of the present invention is to provide an automatic recording microphotometer operating on the well-known principle which consists of causing a beam emanating from a source of light alternately to follow a first path including a reference area (of appropriate density) and a second path including the area to be measured and an adjustable photometric prism assembly or "wedge" to finally reach the cathode of a common photoelectric cell following which an amplifier and indicating devices are arranged. However, while in the known types of devices there is no way of preserving a record of a measurement which has been made and the photometric "wedge" device has to be operated manually, the apparatus forming the subject of this invention (which is also based on the zero calibration method) is characterized first of all by the automatic control of the photometric wedge (the function of which is to restore the balance of the light beam) the displacements of which simultaneously provide for the recording of the measurement.

Furthermore, according to the invention, application is made in the new microphotometer of the general means described in my French patent filed June 8, 1944, for "A device for comparing with a common physical receiving means two radiations of similar character and subsidiarily recording the ratio between said radiations." In other words, the above mentioned beam of light after having alternately passed through the above described paths is caused to strike the photoelectric cell arranged in the input to a suitable amplifier in synchronous relationship with the alternate cutting-off of two separate output paths provided in the output of said amplifier, in such a way that one of said output paths corresponds with the beam of light traversing the calibration or reference area while the other one corresponds with the beam traversing the area to be measured and the photometric wedge device.

According to another feature of the invention, the focussing of the projection system upon the emulsion in the area to be analyzed is obtained through the use of the means described in my French patent application filed June 8, 1944, for "Method of and means for facilitating the focussing of certain devices comprising a projection system such as microphotometers."

In the accompanying drawings there is diagrammatically represented on one hand the general diagram of a microphotometer according to the invention and on the other hand an apparatus embodying the said general diagram this embodiment being merely illustrative and not restrictive in character.

Fig. 2 is a wiring diagram of a thermionic tube amplifier used in the apparatus.

Fig. 5 is a view in elevation of the part designated V in Fig. 4.

Fig. 6 finally represents in diagrammatic showing an optical device facilitating the focussing of the projection system on the sensitive layer of the photographic emulsion in the area to be scanned.

Figure 1:
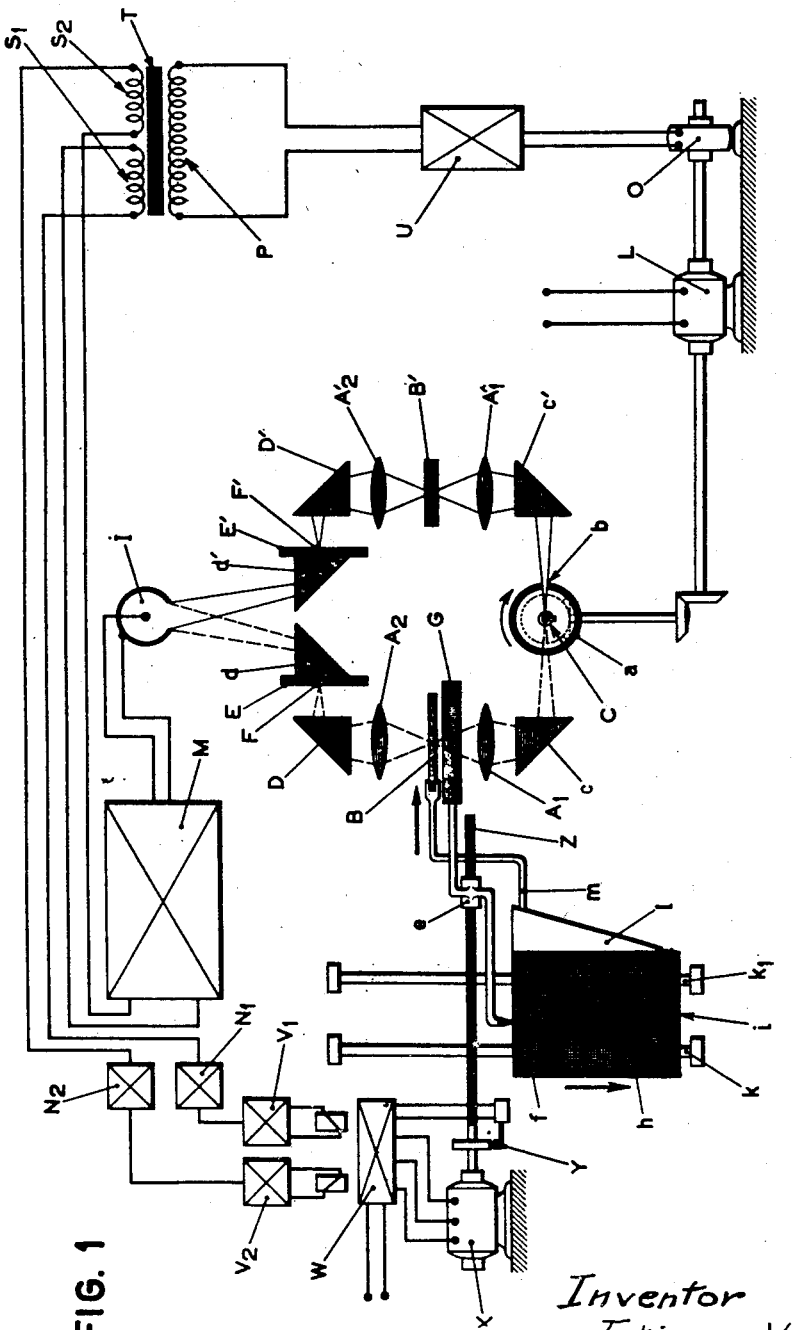
Fig. 1 is a simplified general block diagram of the microphotometer.

As shown in the general block diagram of Fig. 1 the apparatus comprises a light source C arranged axially of a rotating cylinder $a$ formed with a window $b$ whereby a beam of light may be alternately projected onto two reflection prisms $c$ and $c'$ displaced 180° with respect to each other. B' indicates a reference member comprising an area of suitable density on which the lens A'1 is adapted to form an image of the light source or lamp C. An identical lens A'2 picks up the image of the filament on the reference element B' and projects it through the medium of a reflection prism D' onto an adjustable slot F' in a screen E'. From this slot the beam of light is sent through the medium of a reflection prism $d'$ onto the cathode of a photoelectric cell I.

The other path for the light beam includes a lens A1 which, through a photometer wedge G forms an image of the filament of the lamp C upon the photographic emulsion B the density of which is to be measured. The image of the filament on the emulsion B is then taken up by a symmetrical lens A2 to be reformed through the agency of a reflection prism D on an adjustable slot F in a screen E whence the beam is directed through the medium of a prism $d'$ onto the cathode of the above mentioned photoelectric cell I.

The photocell I drives a single-path amplifier M adapted to feed two output amplifiers N1 and N2 which in turn control the actuating devices V1 and V2 of the relay box W of an electric motor X provided with a brake Y likewise controlled from the box W.

The motor X directly or indirectly drives a threaded shaft Z controlling the bodily displacement of a carriage or slide-block $e$. The slide-block is connected with the photometer wedge G and carries a recording arm $f$ adapted to produce a record on a sheet $h$ mounted on a carriage $i$ adapted to move at uniform speed along two guides $k$ and $k1$ transversely of the direction of displacement of the slide-block $e$. One side of the carriage $i$ carries an adjustable inclined surface $l$ adapted to cooperate with the end of a pusher arm $m$ the other end of which is connected with a carriage mounting the emulsion B the density of which is to be measured. It will be seen that the displacement of the carriage $i$ effected in the direction of the arrow shown to the right of said carriage will cause a displacement of the emulsion B in the direction of the arrow indicated above the pusher arm $m$.

The cylindrical obturator or shutter member $a$ for the light source C is driven from an electric motor L.

To obtain synchronized operation between, on one hand, the striking of the light beam issuing from the source C alternately on the reference element B' and on the assembly comprising the emulsion B and the photometer wedge G and, on the other hand, the blocking off of either one or the other of the two paths provided for the output of the amplifier M, use is made (as already stated hereinabove) of the means described in my French patent filed June 8, 1944, for "A device for comparing with a common physical receiving means two radiations of similar character and subsidiarily recording the ratio between said radiations." The motor L also herein drives an alternator O which, through the medium of an amplifier U supplies the primary P of a transformer T comprising two secondaries S1 and S2 interposed between each output of the amplifier N and the related input of the circuits N1 and N2.

The circuit arrangement, to be described in fuller detail somewhat later, is such that each of the circuits N1 and N2 is alternately blocked off under the effect of the pulses applied by the alternator O in synchronism with the shutting off of the light rays issuing from the source C. For example matters may be so arranged that the assembly N2 is cut off when the light beam passes through B while the assembly N1 is on the other hand normally operative at that time, and viceversa.

Figure 2:
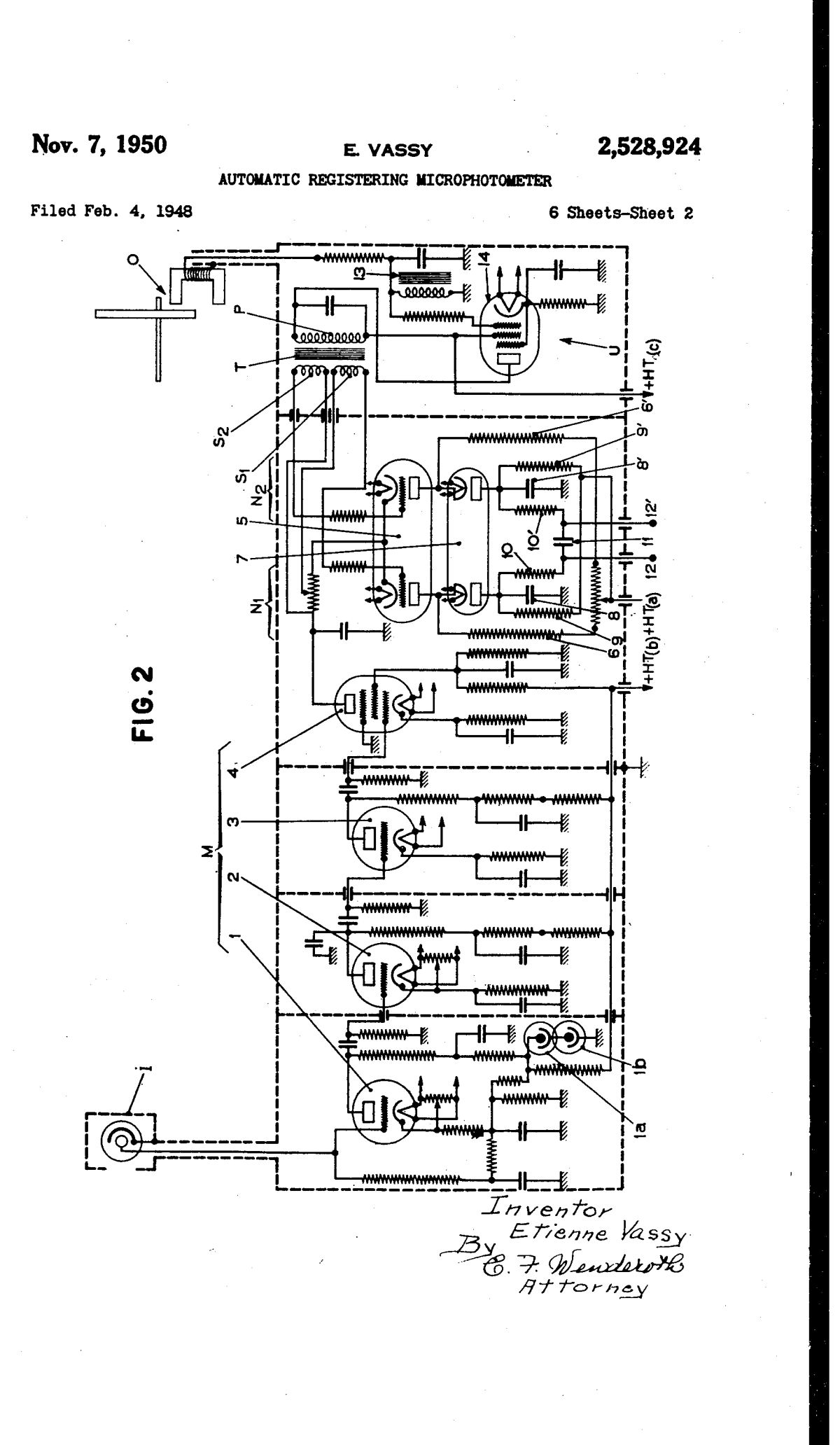

The amplifier device M may for instance be arranged as shown in the diagram illustrated in Fig. 2. This single-path amplifier which serves to amplify the currents supplied by the cell I (regardless of which is the particular path followed by the light beams issuing from the source C and striking said cell) is provided with four carefully shielded and loosely coupled stages to avoid the initiation of oscillations. The coupling between the various stages is of the well-known resistance-capacitance type.

The first amplifier stage is equipped with a dual diode-triode I (for instance a tube of the "6R7" type) only the triode portion of which is used. The amplifying gain in this stage is thus rather low but it allows a more efficient insulation of the grid connection and proper coupling between the cell and the following stage to be accomplished.

The anode of the cell I is mounted with a high lead resistance, this making it possible to apply relatively high voltages to the input of the amplifier and amply dominate over the ground noise.

In order to suitably stabilize the anode voltage in the first amplifier stage which is supplied from the network, there are interposed in the anode circuit of the tube 1 two neon tubes 1a and 1b (for instance type 4687) to avoid that lesser voltage variations in the network as amplified in the following three stages should apply to the grid of the last stage tube voltages capable of momentarily rendering it inoperative.

The following two amplifier stages comprise triodes 2 and 3 (e. g. type 6R7 tubes) while the fourth stage comprises a pentode 4 having a steep characteristic (e. g. a type 6AC7 tube), in the anode circuit of which the separation between the signals alternately striking the cell I is effected. The output circuit of this last mentioned tube comprises as shown two separate paths, the amplifying operation being alternately effected through one or the other side in synchronized relationship with the signal, through the use of means to be described later.

The amplifying paths mentioned above may comprise for instance a dual triode 5 (e. g. a type 6N7 tube) wherein the anodes of the triode elements are connected through suitable resistances 6 and 6' and a balancing potentiometer with the positive terminal of a suitable source of anode voltage.

An alternating voltage produced for instance with a small alternator O provided with a rotating iron core, which voltage is synchronized with the light cut-off effect which acts on the photoelectric cell I and which has a suitable amplitude and phase is applied through the transformer T having two secondary windings S1 and S2 as previously mentioned to the grids of the tube 5 in order to block or cut off during one half cycle period of the alternator, either one of the triode elements of said tube. It follows that only that one of the resistors 6 and 6' which is in series with the triode element which is not triggered off, has the anode current from the pentode 4 flowing through it.

The resistors 6 and 6' are each shunted by one of the diode elements of a dual diode tube 7 (e. g. type 6H6), the cathode of each diode being connected with the end of the corresponding resistances 6 and 6' connected with the anode of one of the triode elements of the tube 5. The anodes of the diode elements are connected with one of the electrodes of two capacitors 8 and 8' of appropriate capacitance, the other electrode of said capacitors being earthed. The capacitors 8 and 8' are permanently charged through the resistances 9 and 9' respectively from a source of anode voltage. It should be noted that the pulses applied to the grid of the tube 4 are of such polarity that they tend to increase the anode current and consequently to increase the voltage drop through that one of the resistors 6 and 6' which is being used at the time under consideration.

The capacitors 8 and 8' are connected through the medium of a filter formed by resistors 10 and 10' and a capacitor 11 with two terminals 12 and 12' which terminate in a symmetrical direct current amplifier stage (see Fig. 3) the output voltage of which will provide, as described hereinafter, for the control of the adjusting displacements of the adjustable photometric device or wedge G, in such a manner as to restore balance between the light fluxes through both optical paths.

The alternator O mentioned previously is simply comprised of a permanent magnet the pole pieces of which carry one or two windings and the reluctance variations in the magnetic circuit (and consequently the induced electromotive forces) being obtained by traversing in front of said pole pieces a soft iron disk eccentrically secured on the end of the shaft of the motor L. A buffer circuit 13 is used to filter the current supplied by the alternator O and the resulting voltage is applied to the grid of a pentode 13 (e. g. type EL3) the load circuit of which is formed by the tuned primary winding P of the transformer T.

Figure 3:
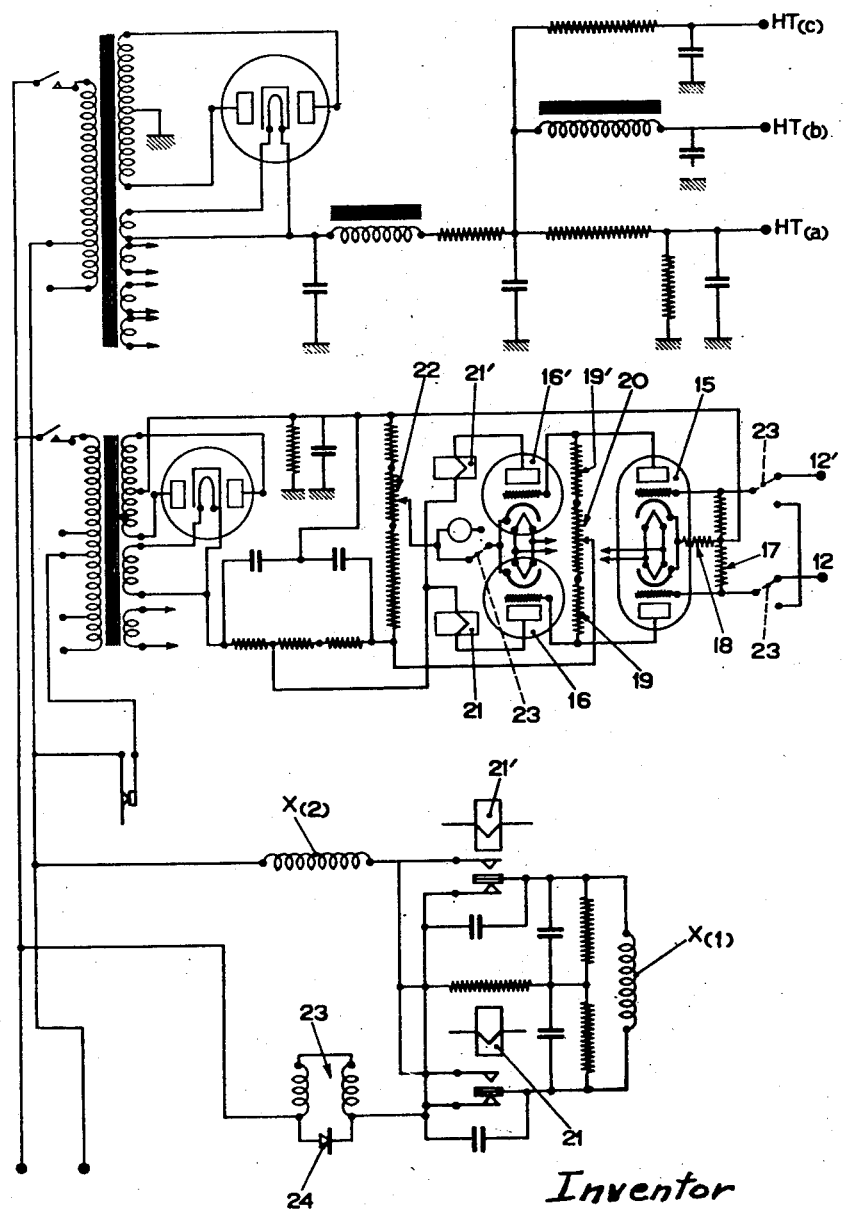
Fig. 3 is a diagram of the supply devices for the amplifier and the relays controlling the motor actuating the photometric wedge device.

The amplifier which has just been described above is supplied from the network, the cathodes of the separate tubes therein being supplied with crude alternating current while the anode circuits receive the various requisite voltages through a rectifier and filtering units of known types (see Fig. 3).

The above-described device operates in the following manner:

When the apparatus is operating at a given instant, one of the triode elements of the tube 5 is blocked or shut off (by the assembly O, T) and the related resistor 6 or 6' has no current flowing through it, whereby both ends of said resistor are at a common potential. The related diode element not supplying any output, the related capacitor 8 or 8' will be charged. During this time, the other triode element of the tube 5 is at its minimum resistivity condition and the resistor 6 or 6' connected thereto is traversed by the anode current from the pentode 4, said current being a function of the voltage applied to the grid of said tube. The diode element in parallel with the resistor under consideration will supply an output and discharge the related capacitor 8' or 8.

The time factor of each of the capacitors 8 and 8' with its load circuit is large as compared to the duration of one of the signals.

For instance, said time factor may be one second as compared with 1/120 second for the duration of the signal. The effect of a plurality of successive signals will therefore cumulatively add up on each of the capacitors 8 and 8'. If the pulses applied to the grid of the tube 4 are similar in amplitude, the capacitors 8 and 8' will discharge in identical fashion and their terminals 12 and 12' will remain at the same potential.

If, on the other hand the successive pulses are different in amplitude, the capacitors 8 and 8' discharge unequally and a difference of potential will appear between the terminals 12 and 12'.

The symmetrical amplifier connected with the terminals 12 and 12' and illustrated in Fig. 3 may comprise for instance a dual triode 15 (e. g. a type 6N7 tube) and two triodes 16 (e. g. type 6C5 tubes). The supply of said amplifier is separate from that of the single-path amplifier (said supply is illustrated at the top of Fig. 3) because of the direct connection from the grids of the tube 15 to the terminals 12 and 12' mentioned above (which in turn are connected with the anode circuit of the tube 7). This is so because those points are subjected to differences of potential the polarity of which is varied according to the origin of the predominant signal. Moreover, between said points and the earth connection of the single-path amplifier, there is a variable direct voltage varied with the average amplitude of the signals applied for the tube 4.

The common cathode of the dual triode 15 is connected with the mid-point of a voltage divider 17 interposed between 12 and 12'. A slight amount of bias is automatically obtained by means of a resistance 18. Each anode of the tube 15 is loaded by a resistance 19 and 19' and a portion of a potentiometer 20 through which the whole assembly may be balanced.

The voltage picked up on each anode is carried over to the grid of one of the triodes 16 and 16' the anode circuit of which comprises the energizing circuit of two "servo-contact" relays 21 and 21'. The cathodes of both tubes 16 and 16' are together connected with the movable arm of an adjusting potentiometer 22 for producing the grid bias of said tubes.

A three-way switch 23 makes it possible to short circuit the grids of the tube 15, insulate them from the terminals 12 and 12' and simultaneously insert a milliammeter into the cathode circuit of both tubes 16 and 16', said milliammeter providing an indication concerning the biassing of said tubes; this indicating instrument is eliminated in normal operation.

The adjustment of the grid bias in the tubes 16 and 16' is such that when the grids of the tube 15 are in short-circuited condition the two relays 21 and 21' each provided with a set of "on" and "off" contacts will be in the "on" condition.

The presence of a voltage of a given polarity across the terminals 12 and 12' will increase one of the plate-currents and decrease the other one so that one of the relays will be restored to rest or off condition thereby rotating the motor X controlled thereby in a predetermined direction.

A reverse voltage across 12 and 12' will bring about a reverse rotation of said motor, whereof the rotor is designated X1 and the stator X2.

The contacts of the relays 21 and 21' are shunted by resistance-capacitance networks so as to minimize sparking and diminish the violence of current surges which might result in reactions in the amplifier N.

The inertia of the rotor of the motor X and the movable members actuated by said motor is such that it is essential to provide said motor with a brake Y formed by an electro-magnet 23 which controls a powerful brake member and is simply mounted in series with the motor; the arrangement is such that the brake blocks the motor as soon as the supply current for the latter is cut off and releases it instantaneously as soon as voltage is applied thereto. The energizing winding 23 for the brake is shunted with a rectifier 24 to prevent vibration of the armature.

Figure 4:
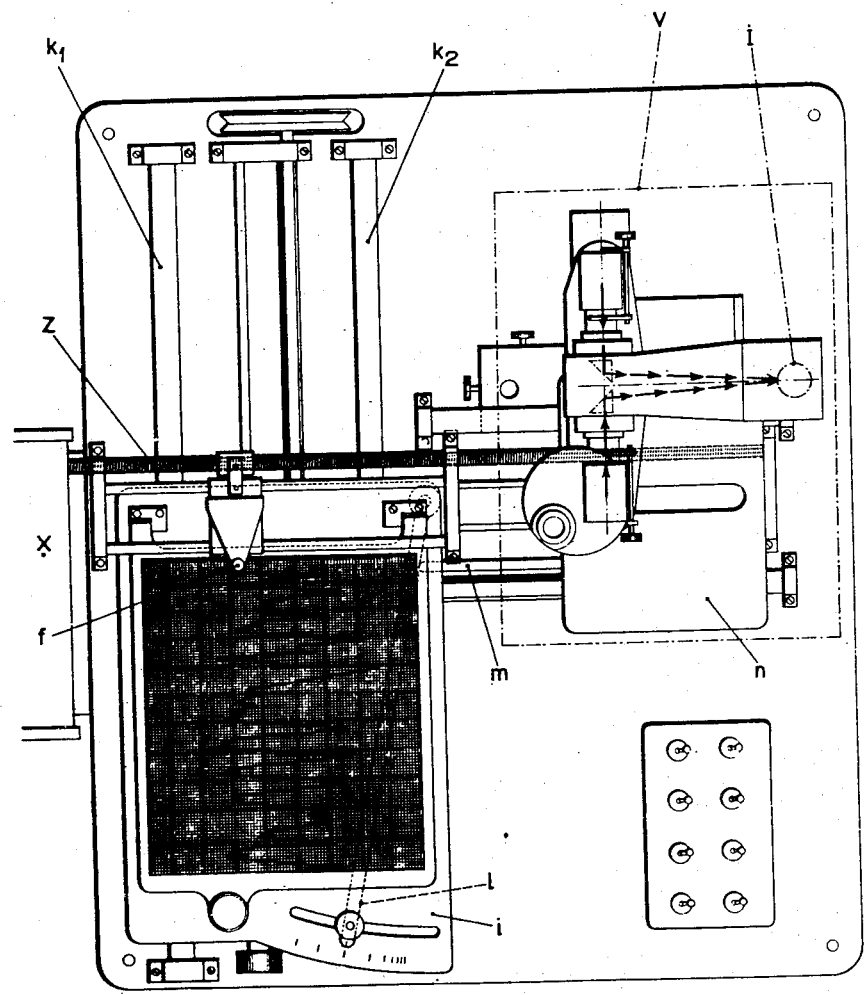
Fig. 4 is a partial view of the apparatus in plan.

Figs. 4 and 5 illustrate the essential portions of the mechanical embodiment of the apparatus of the invention. In these figures similar letters and numerals have been used to designate those elements which have already been mentioned previously. In the right-hand portion of Fig. 5 (and at the top of Fig. 4) there will again be found the path for the light beam issuing from the common source C and passing through the reference element B' before striking the cell I (Fig. 4). At the left-hand side of Fig. 5 is the carriage or slide-block $n$ mounting the emulsion to be analyzed; the carriage $n$ is connected with the pusher arm $m$ controlled through the incline $l$ (which is angularly adjustable) of the carriage $i$ slidable on the guides $k1$ and $k2$.

To provide for the focussing of the projection system, use is made of the means described in my French patent application filed June 8, 1944, for "Method of and means for facilitating the focussing of certain devices comprising a projection system, such as microphotometers." The device in this case consists of mounting the prism D (see in particular Fig. 6) on a revolving support H the axis of rotation of which is designated $xy$, and which makes it possible to substitute for said prism a microscope eye-piece A3 arranged so as to constitute, when brought to the position illustrated in broken lines a suitably magnifying microscope together with the lens A2. With this device, the assembly A2—A3 is first focussed on the emulsion B by moving the lens A2, this operation being simplified because of the presence of the grain structure of the emulsion. Then the lens A1 is operated to accurately focus the image of the filament on said granular structure. The revolving base is then rotated about its axis $xy$ to substitute the prism D for the eye-piece A3 and there then only remains to complete the focus on the slot F by operating either the lens A2 or the screen E comprising the slot F, the filament as the result of the above adjustment being perfectly brought into focus upon the emulsion.

The microphotometer above described in detail operates as follows:

After having secured on the slide-block $n$ the photographic emulsion B (or any other element) to be analyzed and placed a record sheet $h$ on the carriage $i$ preliminarily retracted along the guides $k$ to the opposite position from that shown in Fig. 1, the circuit of the amplifiers is closed to allow the thermionic tubes sufficient time to reach their fully operative condition, then the circuit of the motor $x$ and its relays is closed.

It then is simply necessary to simultaneously start the motor I and the motor, not shown, driving the carriage $i$. Thence on the apparatus operates automatically. The motor $x$ is rotated alternately in one direction then in another to bring the photometer wedge G to such a condition as to ensure at all times that the fluxes passing alternately through the path including the reference element B' and the path in which is included the emulsion B will be equal. This movement of the photometric wedge is used to actuate the recording arm $m$ which inscribes on the sheet $h$ which is fed with a uniform movement, the diagram of density variation as analyzed by the instrument on the emulsion B.

The device forming the subject of this invention can of course be subjected to a great many modifications in detail. Thus for instance if the motor L is a synchronous motor, the arrangement may be simplified by omitting the stage U which supplies the alternating voltage used for separating the signals. Such alternating voltage may be directly supplied from the network, the phase being adjusted through a suitable setting of the distributor cylinder O on the shaft of the motor L. In this case moreover the light source C may be supplied from the network, as through a transformer for instance, and this arrangement will cause the ground noise to be much less objectionable since it will then be superimposed in identical fashion over each signal, which furthermore makes it possible to simplify the filtering of the anode voltages of the cell amplifier.

The photometer wedge may be replaced by any other suitable light flux-reducing device such as polarizing devices, sectors having adjustable angular opening, etc.

The device makes it possible to obtain a record in which the details have a more or less high degree of definition by varying the bias of the triodes 16 and 16'.

The sensibility of the apparatus may thus be modified in accordance with the desired result, and this through a simple operation of a dial.

The new device may be applied to a monochrome device and form a recording spectrophotometer. The characteristics of the device being those of all zero indicating instruments, it is possible to use a highly sensitive photo-cell. That is, it is possible to sacrifice other qualities such as stability and linear operation to greater sensitivity, so as to use a gas cell and even an electron multiplier, whereby the monochrome device may be operated with very narrow slots without losing any portion of its separating capacity.

It should further be stated that the indications of the apparatus depend neither on the light source nor the characteristics of the cell or the linear operation of the amplifier.

It is evident moreover that the exemplary embodiment of a microphotometer as described above and illustrated in the accompanying drawings is merely illustrative and not restrictive in character and that the apparatus forming the subject of this invention may be subjected to yet other alterations in detail without the spirit of the invention being departed from.

What I claim as my invention and desire to secure by Letters Patent is:

1. An automatic microphotometer comprising in combination: a source of light; a rotatable opaque cylinder surrounding said source of light and provided with a slot; a first motor for rotating said cylinder; reflecting means diametrically opposed with respect to said cylinder adapted to be stricken alternatively by the light issuing from said slot; a reference element of standard optical density in the path of the light beam issuing from a first one of said reflection means; an optical element to be analysed and an adjustable photometric wedge in the path of the light beam from the second of said reflection means; a photoelectric cell; third reflection means for directing both said light beams onto said photoelectric cell; means for amplifying the output of said photoelectric cell; two separate output channels fed in parallel from said amplifying means; means controlled by said first motor for blocking alternately said output channels in synchronism with the alternate projection of said light beams through said paths; a second motor; means controlled by said second motor for displacing said adjustable photometric wedge; relay means controlled in opposite directions by the respective outputs of said channels for controlling said second motor to restore the optical balance between said optical paths; and means responsive to the displacement of said adjustable photometric wedge for indicating the amount and direction of said displacement.

2. An automatic recording microphotometer comprising in combination: a source of light; a rotatable opaque cylinder coaxial with and surrounding said source of light, and provided with a slot; a pair of reflection prisms diametrically opposed with respect to said cylinder in the path of the light issuing from said slot to provide two separate optical paths; a reference element of standard optical density in one of said optical paths; first means for focussing the image of said source of light onto said reference element; a slotted screen in said first optical path; second means for focussing said image on said slot in said screen; an adjustable photometric wedge in the second of said optical paths movable in a direction at right angles with respect to said second optical path; an element to be analysed; third means for focussing the image of said light source onto said element to be analysed; a second slotted screen in said second optical path, fourth means for focussing the image formed on said element to be analysed on the slot in said second screen; a photoelectric cell; means including a reflection prism in at least one of said optical paths for directing the light of both said paths on said photoelectric cell; a first motor for rotating said cylinder; A. C. means synchronised with the rotation of said cylinder for blocking alternately said channels; a relay controlled in reverse directions from said channels; a second motor controlled by said relay; means for connecting said second motor with said adjustable photometric wedge for displacement thereof; and registering means responsive to said connecting means for recording the displacements of said photometric wedge.

3. In an automatic recording microphotometer as in claim 2, said synchronised A. C. means comprising an alternator driven from said first motor, a transformer having a primary fed from said alternator and two secondaries; and means for connecting each of said secondaries respectively with a related one of said output channels.

4. In an automatic recording microphotometer as in claim 2, a drive shaft from said first motor, adjustable means for angularly adjustably setting said cylinder on said drive shaft, a source of A. C. supply, means for connecting said first motor to said source, said first motor being a synchronous motor, and means for connecting said A. C. source with said output channels for alternate blocking thereof, the suitable phase relationship between said cylinder and said blocking being secured by suitable angular setting of said cylinder on said drive shaft.

ETIENNE VASSY.

REFERENCES CITED

The following references are of record in the file of this patent:

UNITED STATES PATENTS

| Number | Name | Date |
| --- | --- | --- |
| 1,746,525 | Darrah | Feb. 11, 1930 |
| 2,126,410 | Pineo | Aug. 9, 1938 |
| 2,194,910 | Pineo | Mar. 26, 1940 |
| 2,376,311 | Hood | May 15, 1945 |